United States Patent
Sparks et al.

(10) Patent No.: US 6,424,757 B1
(45) Date of Patent: Jul. 23, 2002

(54) OPTICAL SWITCH ALIGNMENT APPARATUS AND METHOD

(75) Inventors: Adrian P Sparks, Essex; Duncan J Forbes, Herfordshire, both of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/474,543

(22) Filed: Dec. 29, 1999

(51) Int. Cl.[7] .............................. G02B 6/26; G02B 6/42

(52) U.S. Cl. ............................. 385/16; 385/17; 385/18; 385/24; 359/124

(58) Field of Search .............................. 385/16, 17, 18, 385/19, 20, 21, 22, 23; 359/124, 127, 128

(56) References Cited

U.S. PATENT DOCUMENTS 5,867,289 A * 2/1999 Gerstel ...................... 359/110
6,097,858 A * 8/2000 Laor ........................... 385/16

* cited by examiner

Primary Examiner—Cassandra Spyrou
Assistant Examiner—Leo Boutsikaris
(74) Attorney, Agent, or Firm—Lee, Mann, Smith, McWilliams Sweeney & Ohlson

(57) ABSTRACT

In optical communication switching equipment there is a need to set up optical paths through the switch before there is an optical signal present. The present invention provides an optical switching apparatus comprising: an optical switch having a number of optical paths for switching optical channels; a demultiplexer coupled to said switch; a broadband light source coupled to said demultiplexer which distributes said light in said channels to enable correct alignment of said optical paths.

8 Claims, 4 Drawing Sheets

OPTICAL SWITCH ALIGNMENT APPARATUS AND METHOD

FIELD OF THE INVENTION

The present invention relates to optical switching, and particularly to an apparatus and method for optical switch alignment.

BACKGROUND OF THE INVENTION

Communications networks are increasingly becoming all optical networks, incorporating optical switching. Optical switches are typically fabricated using micro electromechanical systems (MEMS) technology. A recently developed optical switch of this type is described in "Performance of a 576×576 Optical Cross Connect" by H Laor, A Richards, E Fontenot, Proceedings of the National Fibre Optic Engineers Conference Sep. 28, 1999, Chicago, USA"; which is incorporated herein by reference. Such switches may be used to switch wave division multiplex (WDM) signals as a group, or the WDM signals may be demultiplexed outside the switch and switched individually as channels, or as groups of channels as desired. MEMS switches use moveable mirrors to redirect and align optical paths between switching modules within the switch. The switching paths must be correctly aligned to complete an optical signal or channel connection across the switch.

There is a need to set up optical paths through the switch before there is an optical signal or channel present. That is the optical path must be set up and verified before transmission of optical channels to prevent misconnection through misalignment of the moveable mirrors in the switch, and hence to prevent the introduction of errors into the optical signal by the switching function of the network.

FIG. 1 shows a schematic diagram of a MEMS based optical switch incorporating a prior art optical path alignment arrangement. The optical switch comprises a number of port cards 1 coupled to modules of a MEMS core switch 2 comprising focusing lenses, fixed and moveable mirrors as described below, and in more detail in the above reference for example. Each port card 1 corresponds to a pair of modules in the switch 2 and connects optical fibres (for example 3a and 4a) to modules of the MEMS core switch 2, which switches incoming fibres (3a, 3b . . . ) to desired outgoing fibres (4a, 4b . . . ). A typical core network switch has 156 pairs of modules.

The optical signal wavelength band is typically determined by standards, for example on or around 1500 nm for core network transmission. The prior art arrangement uses light of a different wavelength injected into the optical path to enable correct alignment of the mirrors in the MEMS core switch 2. Light from a local light source 5 within each port card 1 is injected into the optical path 3 using a wavelength selective coupler 6. Another wavelength selective coupler 6 on the other side of the MEMS core 2 of each card 1 is used to filter off the light injected which is then detected by a receiver or detector 7, and used to indicate that the MEMS mirrors are correctly aligned. A major disadvantage of this arrangement however is the addition of two wavelength selective couplers 6 and a local light source for each port card 1 of the switch. This adds significantly to the per port cost of the switch fabric.

SUMMARY OF THE INVENTION

It is an object of the present invention to provide an improved apparatus and method for optical switch alignment.

In a first aspect the present invention comprises an optical switching apparatus comprising:
  an optical switch having a number of optical paths for switching optical channels;
  a demultiplexer coupled to said switch;
  a broadband light source coupled to said demultiplexer which distributes said light in said channels to enable correct alignment of said optical paths.

Preferably said apparatus further comprises receiver means coupled to said switch and arranged to indicate correct alignment of said optical paths by receiving said light.

Preferably said receiver means comprises local receivers for each said channel.

Preferably the light source is an E-LED.

Alternatively the light source is amplifier spontaneous emissions.

Preferably the light source is modulated.

Preferably said modulation is amplitude modulation.

Preferably the switch is an MEMS switch.

In a second aspect the present invention comprises an optical switching apparatus comprising:
  an optical switch having a number of optical paths for switching optical channels;
  a demultiplexer coupled to said switch;
  a modulated broadband light source coupled to said demultiplexer which distributes said light in said channels to enable correct alignment of said optical paths.

In a third aspect the present invention comprises an optical switching apparatus for enabling correct alignment of optical paths in an optical switch, said apparatus comprising:
  a demultiplexer coupled to said switch;
  an in-band light source coupled to said demultiplexer which distributes said light in demultiplexed optical channels to enable correct alignment of said optical paths.

In a further aspect the invention comprises a method of aligning optical paths through an optical switch for switching a number of optical channels, the method comprising:
  generating a broadband light source in a multiplexed signal comprising said channels;
  demultiplexing said signal;
  receiving said light in the demultiplexed channels to indicate correct alignment of said optical paths.

In a yet further aspect the present invention comprises a computer program on a machine readable medium, said computer program being capable of performing a method of controlling an optical switching apparatus to align optical paths through an optical switch for switching a number of optical channels, the method comprising:
  introducing a broadband light source into a multiplexed signal comprising said channels;
  demultiplexing said signal;
  receiving said light in the demultiplexed channels to indicate correct alignment of said optical paths.

BRIEF DESCRIPTION OF THE DRAWINGS

In order that a greater understanding of the invention can be obtained, embodiments of the invention will now be described with reference to the accompanying drawings, by way of example only and without intending to be limiting, in which.

DETAILED DESCRIPTION

Figure 2:
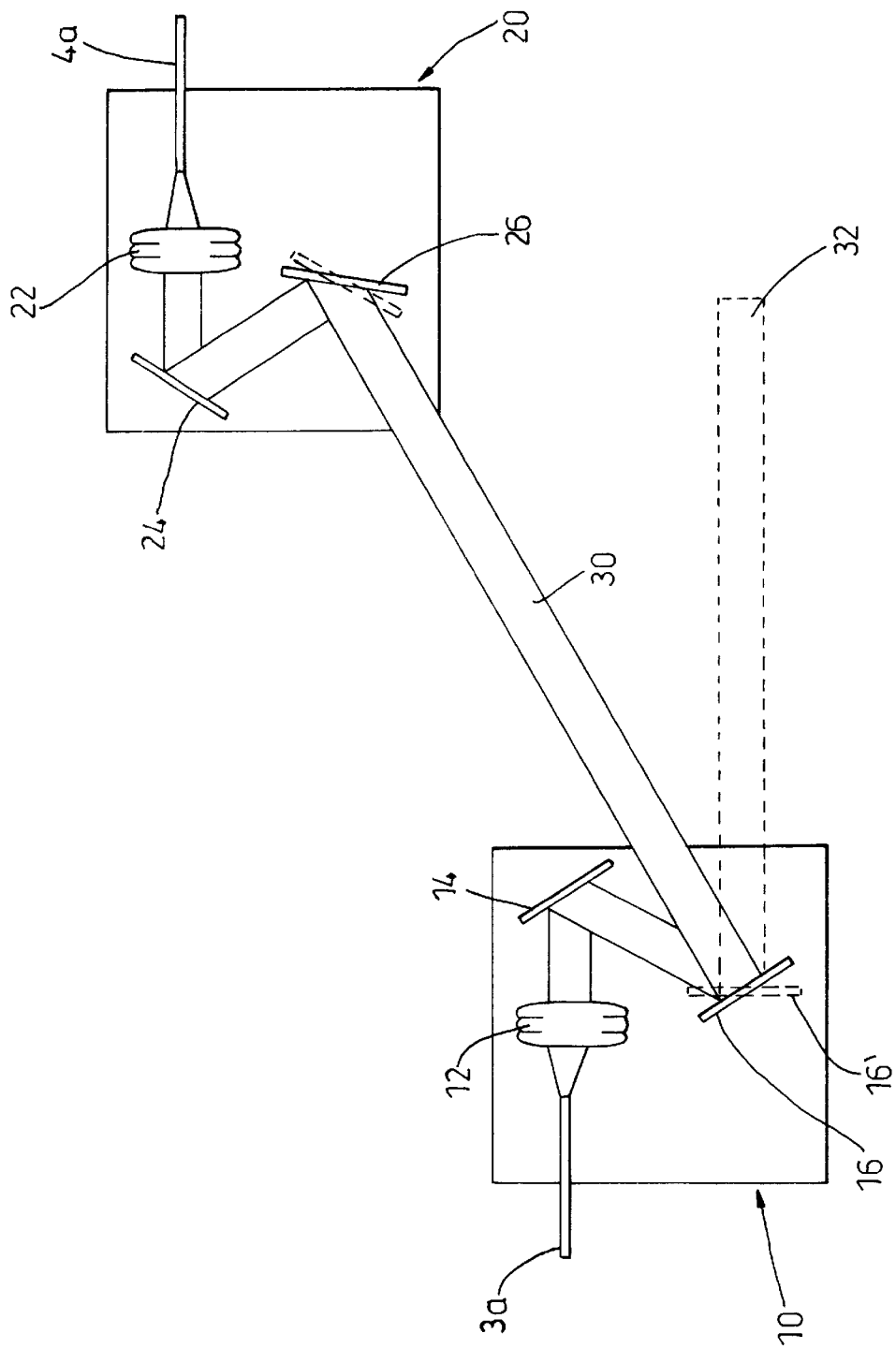
FIG. 2 shows a typical MEMS switch core optical connection between two modules.

A micro electro-mechanical systems (MEMS) optical switch is constructed of a number of modules. FIG. 2 shows the optical path which represents a connection between two modules 10 and 20. Light from a fibre 3a passes through a focusing lens 12. The light which forms the beam is reflected off a fixed mirror 14 to keep device packaging small. It is then reflected off a movable mirror 16 which precisely directs the beam in two axes. If the movable mirror is in position 16', the beam will move along an alternative path shown as 32.

To make an optical connection between modules 10 and 20, the moveable mirror 16 directs the beam at the movable mirror 26 of a targeted second module 20. At the same time the moveable mirror 26 of the second module 20 is controlled to deflect the beam 30 towards the fixed mirror 24, into the lens 22 and hence into the fibre 4a completing the connection. It is the co-ordinated control of deflection angles by the two moveable mirrors 16 and 26 that creates the optical connection between the two transmission fibres 3a and 4a.

By having two arrays of such modules, optical signals coming in from a first array (corresponding to fibres 3a, 3b . . . ) may be directed into any of the output fibres 4a, 4b . . . of the second array. The terms input and output are used for convenience, the optical path through any two modules in a connection being bi-directional.

Figure 1:
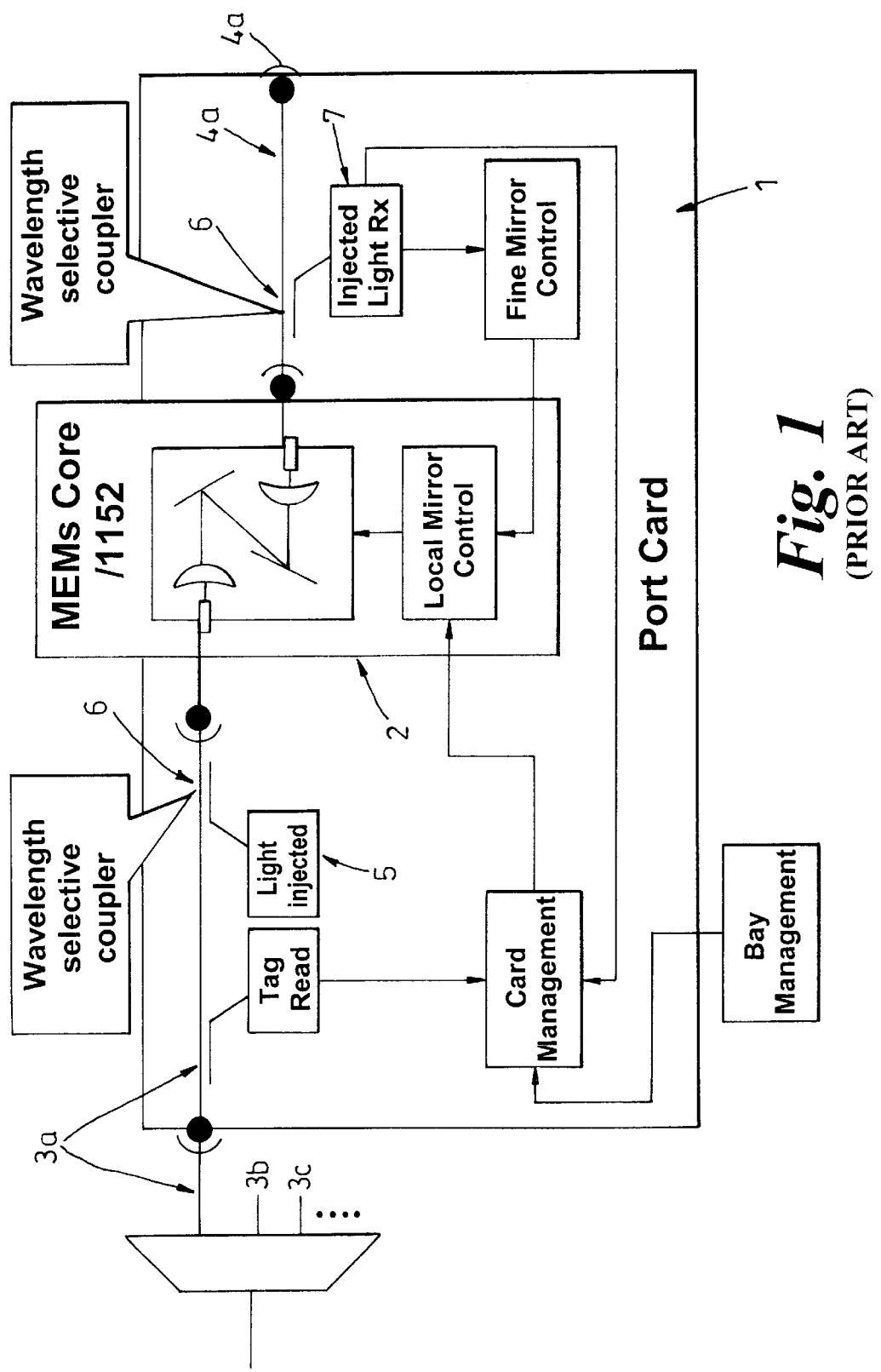
FIG. 1 shows a prior art optical switch alignment arrangement.

As described above referring to FIGS. 1 and 2, a port card 1 couples a pair of optical fibres (eg 3a and 4a) to a corresponding pair of modules (eg 10 and 20) in a MEMS core switch 2 having a number of such pairs and which is capable of switching between modules on one array (associated with the "input" fibres 3) to another array (associated with "output" fibres 4). Each fibre 3 or 4 may carry one or a number of optical channels. The term optical channel refers to a wavelength or discrete range of wavelengths which carries a signal and which is distinguished from one or more other optical channels using different wavelengths or ranges of wavelengths as is known in Wave Division Multiplexing (WDM). Typically optical fibres external to the switching apparatus (A and B) are used to carry WDM signals which are then demultiplexed into individual optical channels and switched as individual channels. A demultiplexer 15 separates the optical channels and puts them onto separate fibres 3 (3a, 3b . . . 3x) where they are each connected to a port card 1 for switching by the core switch 2. Alternatively the complete WDM signal or groups of channels may be switched.

As described above, there is a requirement to set up a connection between modules before there is signal light in the optical channel being switched to prevent the misconnection of traffic and to avoid the traffic being delayed by the sum of all the optical switch set-up times when first connected to the network. Once the path is correctly set up, the moveable mirrors being correctly aligned in the modules concerned the newly switched optical channel may be used for the transmission of optical signals. Prior art solutions typically use wavelength selective couplers 6 within the port cards to introduce and detect out of band light to optimise mirror alignment in the connection. Two such couplers 6 are used for each channel or port card section 1. The use of these wavelength selective couplers and a separate light source for each port however significantly increases the cost of port cards, and may also contribute to signal attenuation or other performance deterioration.

Light sources for alignment purposes may also be placed around the moveable mirrors. However it can be difficult to ensure that these light sources are aligned to follow a path parallel to that taken by the light from the input fibre. These light sources and detectors also represent additional expense and manufacturing complexity.

Figure 3:
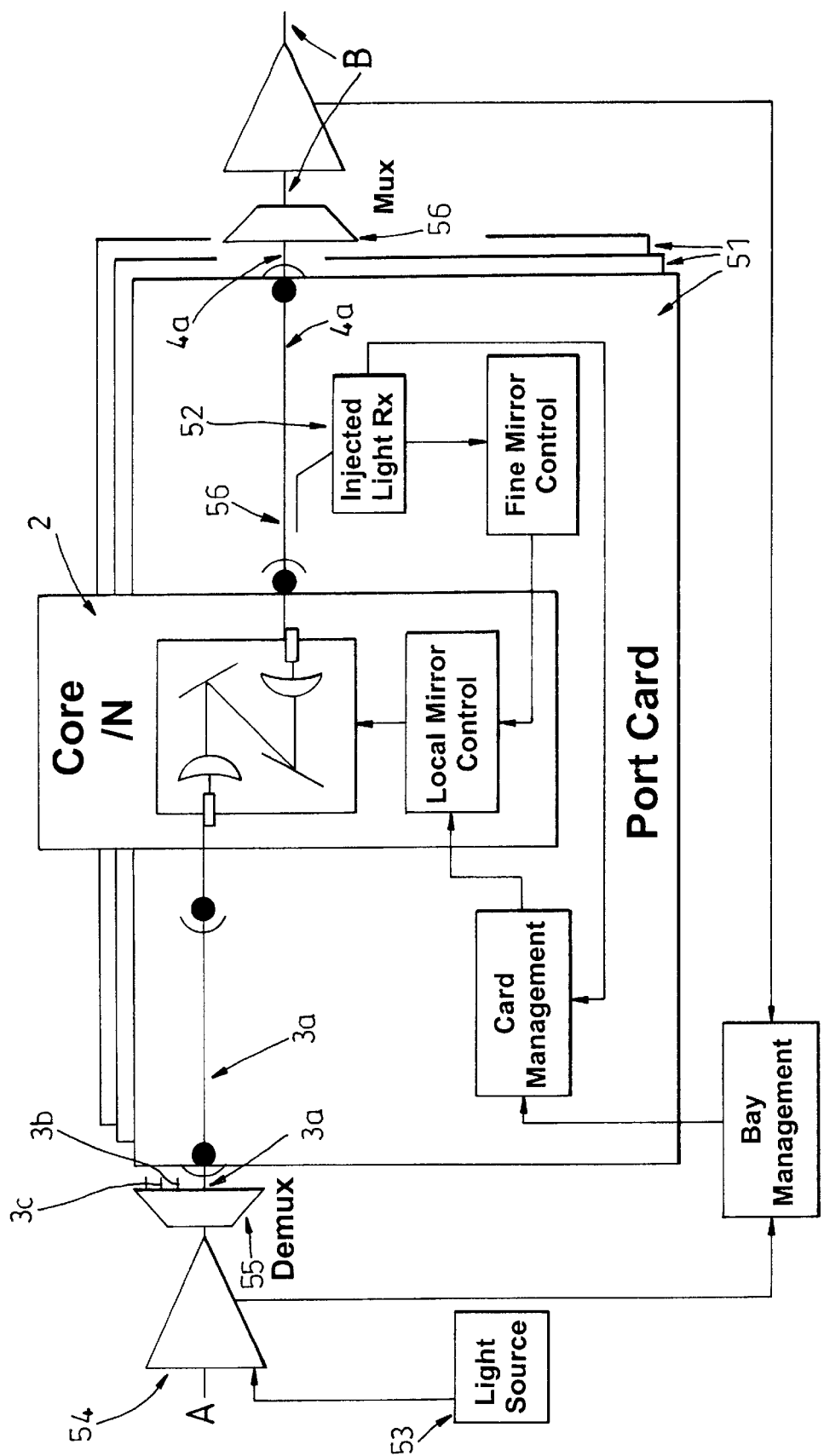
FIG. 3 shows an optical switch alignment arrangement according to a preferred embodiment of the present invention.

Referring to FIG. 3, a preferred embodiment switching apparatus and method is there described. The apparatus comprises a number of port cards 51 each coupling fibres (for example 3a and 4a) to the MEMS core switch 2. Each port card 51 comprises an injected light receiver or detector 52. The apparatus also comprises a demultiplexer 55 and optionally a multiplexer 56, respectively coupled (by fibres 3a and 4a) to the input and output of the port cards 51. A light source 53 is available prior to the demultiplexer 55. Preferably the apparatus further comprises or uses an existing optical amplifier 54 which is coupled to the input of the demultiplexer 55.

The light source 53 is preferably an E-LED (Edge Emitting Light Emitting Diode) which is coupled into the demulitplexer 55 input using the optical amplifier 54 for example. Preferably use is made of an existing amplifier 54 to further reduce the component count of the apparatus. Alternatively amplifier spontaneous emissions from the amplifier 54 may be used as a light source thereby further reducing component count. The demultiplexer 55 divides a combined optical signal in fibre A comprising a number of optical channels into separate optical channels or groups of optical channels corresponding to fibres 3a, 3b . . . , each individual channel or group of channels being coupled to a port card 51. The channels are then switched individually and if desired recombined into a common optical signal such as WDM by the multiplexer 56 as is known in the art. The light source 53 is injected into the "incoming" fibres 3 by introducing it into the fibre A before the demulitplexer 55, into fibre A which distributes it into the demultiplexed optical channels in fibres 3a, 3b, 3c . . .

To achieve this the light introduced by the light source 53 is broadband such that the injected light shares the wavelength range of the optical channels in the multiplexed signal in fibre A so that it is distributed across all the optical channels and is present in each optical channel when the demultiplexer 55 divides the multiplexed signal into individual optical channels. The injected light travels along the fibres 3a , 3b etc through the core switch 2 and is detected by the injected light receiver 52 of each port card section 51, which is optimised for detecting the injected light.

The light source 53 is preferably modulated according to a predetermined modulation scheme. For example the light source 53 is amplitude modulated to add a tone which can be readily detected by the detectors 52. This allows the injected light to be introduced while an optical signal is present, the receiver 52 being optimised for detecting this modulated light. It also simplifies the design of the receiver. The receiver or detector 52 is fed a small portion of the signal light from the fibre 4a which comprises the injected light. This portion or sample is derived from a splitter 56 for example.

The amplifier 54 and light source 53 (eg an E-LED) are located before the demulitplexer divides out the channels.

This reduces the component count of the apparatus by requiring only one light source and amplifier to introduce the injected light for correct alignment of the switch. The use of amplifier spontaneous emissions further reduces component count by requiring only the amplifier 54. The light source is broadband so that it covers all in-band channels incorporated within the combined optical signal fibre A and B.

Correct alignment of the mirrors or optical path may be determined by detecting maximum power of the injected light at the receiver 52 for example.

While the preferred embodiment has been described with respect to MEMS switches, other types of optical switches could also benefit from the invention, for example those using those using refraction, diffraction or reflection. The invention has application in telecommunications data networking switches for example.

For the purposes of this specification, the terms "optical" and "light" should be understood as pertaining not only to the visible part of the electromagnetic spectrum, but also to the infra-red and ultra-violet parts that bound the visible part.

While the invention has been described with respect optical fibres components, free space or optical waveguide components could also be used.

The light source 53 may comprise two or more broadband sources in order to cover a multiplexed signal having optical channels covering two or more discrete and separate ranges of wavelengths. This approach which avoids having a single broadband source covering all the optical channels as well as wavelengths in-between avoids the introduction of light in between groups of channels which may interfere with switching or other optical control equipment coupled to the switching apparatus.

Figure 4:
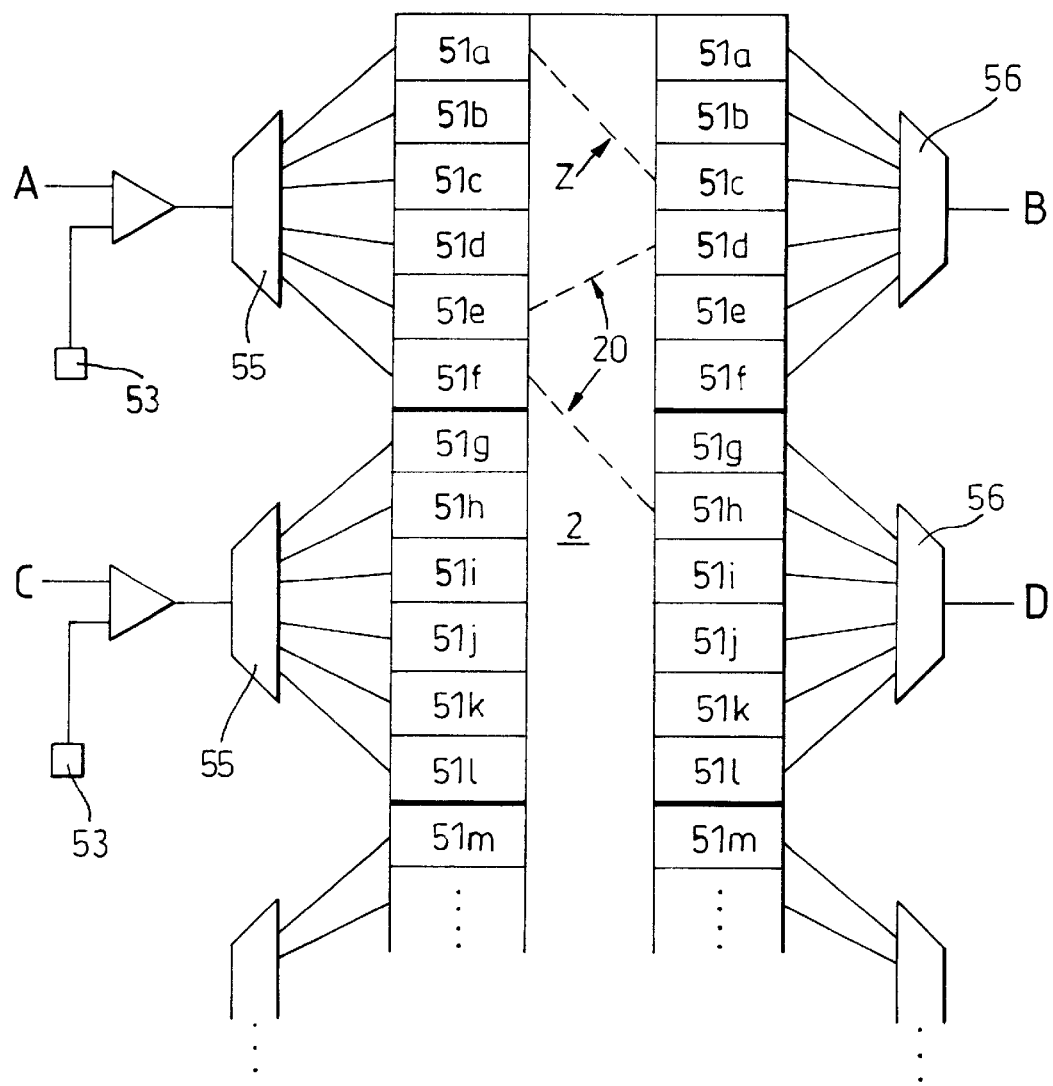
FIG. 4 shows a switching apparatus according to the invention.

FIG. 4 shows a switching apparatus according to the present invention which comprises an optical switch or switch core 2, a number of port cards 51a, 51b . . . , a number of demultiplexers 55 and light sources 53. The demultiplexer 55 demultiplexes optical signals from incoming external fibres A, C . . . , into a number of optical channels or groups of channels corresponding to fibres 3a, 3b, 3c . . . , which couple the demultiplexers 55 to the port cards 51a, 51b, 51c . . . The port cards couple optical channels to the core switch 2 which switches the incoming ports to outgoing ports, a selection of optical paths within the switch being shown in dashed outline by reference 30. For example, the optical channel corresponding to fibre 3a from the demulitplexer 55 into port card 51a, is switched to port card 51c and from there on into fibre 4c where it is multiplexed by multiplexer 56 into external fibre B.

Broadband lightsource 53 is introduced into the optical signal coming from external fibre A prior to the demultiplexer 55 such that the broadband lightsource is also demultiplexed, components or different wavelengths of this appearing in each of the demultiplexer outputs corresponding to fibres 3a–f. In the example given, a detector 52 in port card 51c will detect light from light source 53 to indicate that the mirrors within switch 2 are properly aligned between the modules corresponding to port card 51a and wavelengths, the detectors 52 in the port cards detect either all the wavelength range of the broadband source 53 or are modified or tuned to detect just the wavelength corresponding to the optical channel they are expecting to receive. In the example given, the detector 52 of port card 51c may be arranged to detect light corresponding to the wavelengths of the optical channel associated with fibre 3a or any of the wavelengths associated with broadband source 53. Preferably each broadband light source 53 associated with an incoming external fibre A, C . . . , has a different modulation scheme to distinguish it from other incoming optical signals such that in the switching example shown by optical path Z between port cards 1f and 1h, the receiver or detector 52 of port card 1h is optimised to detect the modulation scheme associated with incoming fibre A.

The foregoing describes the invention including the preferred form thereof. Alterations and modifications as would be obvious to someone skilled in the art are intended to be incorporated within the scope hereof.

What is claimed is:

1. An optical switching apparatus comprising:

an optical switch having a number of optical paths for switching optical channels;

a demultiplexer coupled to said switch;

a source of amplifier spontaneous emissions light coupled to said demultiplexer which distributes said light in said channels to enable correct alignment of said optical paths.

2. An apparatus as claimed in claim 1 further comprising receiver means coupled to said switch and arranged to indicate correct alignment of said optical paths by receiving said light.

3. An apparatus as claimed in claim 2 wherein said receiver means comprises local receivers for each said channel.

4. An apparatus as claimed in claim 1 wherein the switch is an MEMS switch.

5. An optical switching apparatus comprising:

an optical switch having a number of optical paths for switching optical channels;

a demultiplexer coupled to said switch;

a source of amplifier spontaneous emissions light coupled to said demultiplexer which distributes said light in said channels to enable correct alignment of said optical paths.

6. An optical switching apparatus for enabling correct alignment of optical paths in an optical switch, said apparatus comprising:

a demultiplexer coupled to said switch;

an in-band light source of amplifier spontaneous emissions light coupled to said demultiplexer which distributes said light in demultiplexed optical channels to enable correct alignment of said optical paths.

7. A method of aligning optical paths through an optical switch for switching a number of optical channels, the method comprising:

introducing light from amplifier spontaneous emissions into a multiplexed signal comprising said channels;

demultiplexing said signal;

receiving said light in the demultiplexed channels to indicate correct alignment of said optical paths.

8. A computer program on a machine readable medium, said computer program being capable of performing a method of controlling an optical switching apparatus to align optical paths through an optical switch for switching a number of optical channels, the method comprising:

introducing light from a source of amplifier spontaneous emissions into a multiplexed signal comprising said channels;

demultiplexing said signal;

receiving said light in the demultiplexed channels to indicate correct alignment of said optical paths.

* * * * *